US008208021B2

(12) United States Patent  
Unoura

(10) Patent No.: US 8,208,021 B2  
(45) Date of Patent: Jun. 26, 2012

(54) VEHICLE AND LANE MARK DETECTION DEVICE

(75) Inventor: Kiyozumi Unoura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 978 days.

(21) Appl. No.: 12/097,430

(22) PCT Filed: Nov. 14, 2006

(86) PCT No.: PCT/JP2006/322619  
§ 371 (c)(1),  
(2), (4) Date: Jun. 13, 2008

(87) PCT Pub. No.: WO2007/077682  
PCT Pub. Date: Jul. 12, 2007

(65) Prior Publication Data  
US 2009/0167864 A1 Jul. 2, 2009

(30) Foreign Application Priority Data  
Dec. 28, 2005 (JP) .................................. 2005-379332

(51) Int. Cl.  
*H04N 7/18* (2006.01)
(52) U.S. Cl. ........................................ 348/148
(58) Field of Classification Search .................. 348/148; 340/901; 382/104  
See application file for complete search history.

(56) References Cited

U.S. PATENT DOCUMENTS 5,351,044 A * 9/1994 Mathur et al. ................ 340/901  
5,922,036 A * 7/1999 Yasui et al. ..................... 701/28  
(Continued)

FOREIGN PATENT DOCUMENTS

JP 08-315125 A 11/1996  
(Continued)

OTHER PUBLICATIONS

Jeong, Seung Gweon et al., "Real-Time Lane Detection for Autonomous Vehicle" 2001. Industrial Electronics, 2001. Proceedings. ISIE 2001. IEEE International Symposium. pp. 1466-1471 vol. 3.*

(Continued)

*Primary Examiner* — Faruk Hamza  
*Assistant Examiner* — Benjamin Ailes  
(74) *Attorney, Agent, or Firm* — Arent Fox LLP

(57) ABSTRACT

A vehicle includes: an image acquisition means (4) which acquires a road image via an imaging means (3); an edge extraction means (5) which extracts edge points from the acquired image; a line search means (6) which searches the extracted edge points for line components; an evaluation value calculation means (7) which calculates an evaluation value indicating the degree that each line component approximates a linear lane mark on the road for the line components searched for; a lane mark candidate selection means (8) which selects line components each having an evaluation value greater than a predetermined threshold value as candidates for a line component corresponding to the lane mark from the line components searched for; and a lane mark detection means (9) which detects the lane mark by determining the line component corresponding to the lane mark from the selected candidates for the line component. This allows the detection accuracy to be increased by preventing an object other than a lane mark on the road from being incorrectly detected as a linear lane mark such as a white line when detecting a linear lane mark such as a white line from the road image.

14 Claims, 6 Drawing Sheets

U.S. PATENT DOCUMENTS

| | | | |
|---|---|---|---|
| 6,546,118 B1 | 4/2003 | Iisaka et al. | |
| 6,813,370 B1* | 11/2004 | Arai | 382/104 |
| 6,868,168 B2* | 3/2005 | Tsuji | 382/104 |
| 7,295,682 B2* | 11/2007 | Otsuka et al. | 382/103 |
| 7,411,486 B2* | 8/2008 | Gern et al. | 340/438 |
| 7,421,094 B2* | 9/2008 | Ikeda et al. | 382/104 |
| 7,482,909 B2* | 1/2009 | Haug | 340/436 |
| 7,583,816 B2* | 9/2009 | Kakinami et al. | 382/104 |
| 7,653,482 B2* | 1/2010 | Sumizawa | 701/448 |
| 7,808,523 B2* | 10/2010 | Nishida et al. | 348/148 |
| 7,881,496 B2* | 2/2011 | Camilleri et al. | 382/104 |
| 2003/0103650 A1* | 6/2003 | Otsuka et al. | 382/104 |
| 2003/0160866 A1* | 8/2003 | Hori et al. | 348/116 |
| 2004/0042638 A1* | 3/2004 | Iwano | 382/104 |
| 2005/0135658 A1* | 6/2005 | Yamamoto et al. | 382/104 |
| 2005/0228587 A1* | 10/2005 | Kobayashi et al. | 701/300 |
| 2005/0265579 A1* | 12/2005 | Nishida | 382/103 |
| 2007/0225913 A1* | 9/2007 | Ikeda et al. | 701/223 |

FOREIGN PATENT DOCUMENTS

| | | |
|---|---|---|
| JP | 11-085999 | 3/1999 |
| JP | 11-147473 A | 6/1999 |
| JP | 2003-178399 A | 6/2003 |
| JP | 2003-256854 A | 9/2003 |
| JP | 2004-246641 A | 9/2004 |

OTHER PUBLICATIONS

Xinguo Yu et al: "A Gridding Hough Transform for Detecting the Straight Lines in Sporte Video" IEEE International Conference on Multimedia and Expo, 2005. ICME 2005. Amsterdam, The Netherlands, Jul. 6-8, 2005, IEEE, Piscataway, NJ, USA LNKD-DOI:10.1109/ICME.2005.1521474, Jul. 6, 2005, pp. 518-521.

Song Jiqiang et al: : A Hough transform based line recognition method utilizing both parameter space and image sapce Pattern Recognition, Elsevier, GB LNKD-DOI:10.1016/J.PATCOG.2004.06.007, vol. 38, No. 4, Apr. 1, 2005, pp. 539-552.

Yichang (James) Tsai et al: "Automatic Roadway Geometry Measurement Algorithm Using Video Images" Jan. 1, 2005, Image Analysis and Processing—ICIAP 2005 Lecture Notes in Computer Science;; LNCS, Springer, Berlin, DE, pp. 669-678.

* cited by examiner

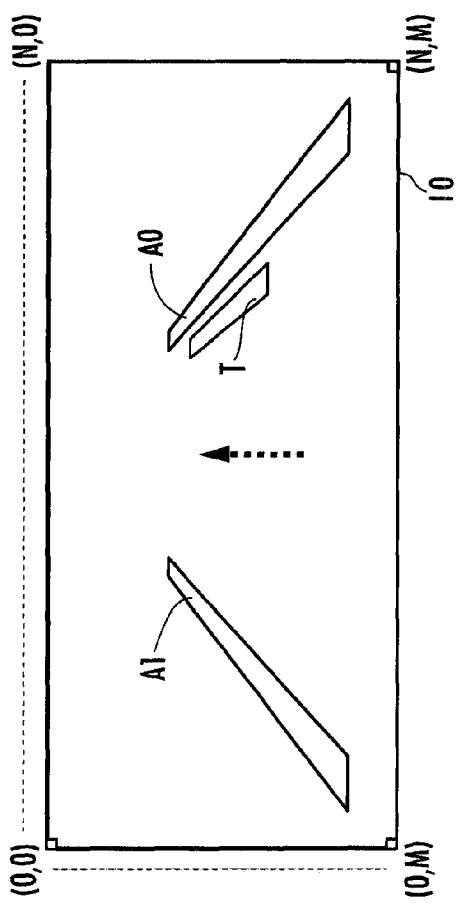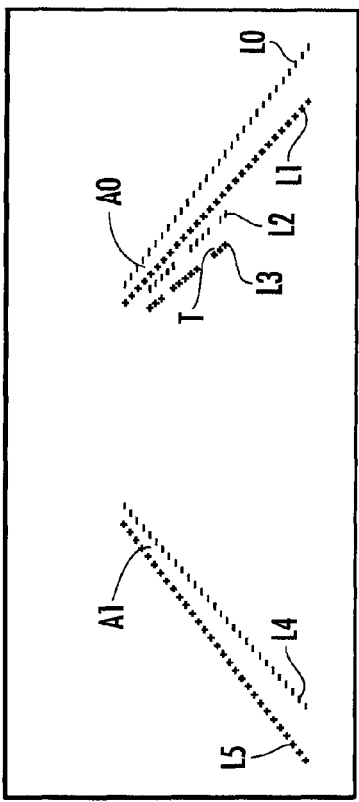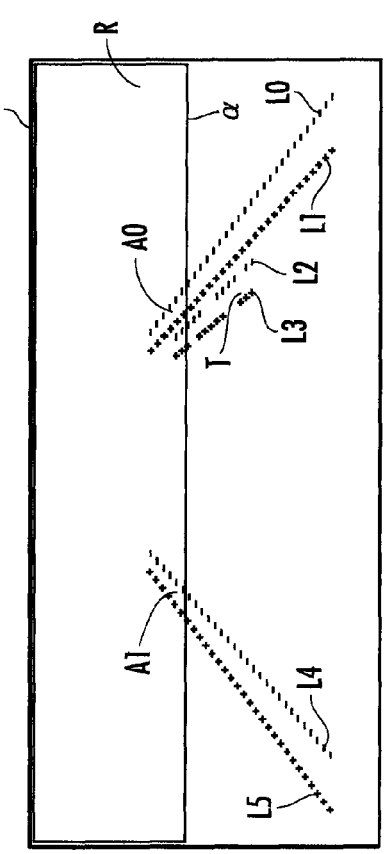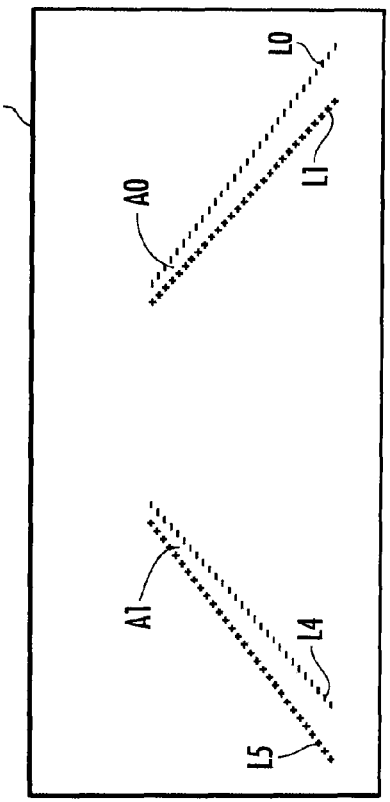

VEHICLE AND LANE MARK DETECTION DEVICE

TECHNICAL FIELD

The present invention relates to a vehicle and a lane mark detection device for detecting a lane mark such as a white line on a road by processing a road image acquired via an imaging means such as a camera.

BACKGROUND ART

In recent years, there has been known a technique for detecting a lane mark such as a white line on a road by capturing an image of a road along which a vehicle travels and processing the acquired image with an imaging means such as a CCD camera mounted on the vehicle and for controlling the vehicle or providing a driver with information on the basis of information on a lane (traffic lane) along which the vehicle travels recognized from a detection result (refer to, for example, Japanese Patent Application Laid-Open No. Hei 11-147473/1999 (hereinafter, referred to as Patent Document 1).

The steering force assisting device in Patent Document 1 extracts a point where luminance changes from dark to light (positive edge point) and a point where luminance changes from light to dark (negative edge point) on the basis of a peak of a derivative value with the luminance value on each horizontal line differentiated from the left in the lateral direction regarding a plurality of horizontal lines on the road image. Then, a combination of edge points, in which the positive edge point and the negative edge point appear in this order on each horizontal line and in which the edge points are arranged at intervals considered to be appropriate for a white line, is extracted as a white line candidate. Then, a white line is detected from the extracted white line candidates on the basis of its position on the image.

However, there may be, for example, a trail (track) of wheels of the vehicle traveling along the road besides a lane mark such as a white line on the road. The wheel track often appears along the white line in the vicinity thereof and changes in luminance in the edge portion like the white line. Therefore, the wheel track has similar features to the white line on the image. Particularly, on the wet road like a road after rain, the edge portion of the wheel track reflects light, by which a luminance difference between the edge portion and the road surface is similar to a luminance difference between the white line and the road surface. Consequently, it is difficult to distinguish the lane mark such as a white line from a wheel track or the like other than the lane mark on the road using the technique described in Patent Document 1, thereby incorrectly detecting the object other than the lane mark as a lane mark disadvantageously.

DISCLOSURE OF THE INVENTION

Problem to be Solved by the Invention

It is an object of the present invention to solve the above problem and to provide a vehicle and a lane mark detection device capable of increasing the detection accuracy by preventing an object other than a lane mark on a road from being incorrectly detected as a linear lane mark such as a white line when detecting a linear lane mark such as a white line from a road image.

Means for Solving the Problem

The present invention has been provided to achieve the above object, and therefore a vehicle according to the present invention comprises: an imaging means; an image acquisition means which acquires an image of a road via the imaging means; an edge extraction means which extracts edge points by performing edge extraction for the image acquired by the image acquisition means; a line search means which searches the edge points extracted by the edge extraction means for line components each of which is point sequence data of a plurality of linearly located edge points; an evaluation value calculation means which calculates an evaluation value indicating the degree that each line component approximates a linear lane mark on the road for the line components searched for by the line search means; a lane mark candidate selection means which selects line components each having an evaluation value or a value obtained by filtering the time series of the evaluation value greater than a predetermined threshold value as candidates for a line component corresponding to the lane mark from the line components searched for by the line search means; and a lane mark detection means which detects the lane mark by determining the line component corresponding to the lane mark from the candidates for the line component selected by the lane mark candidate selection means.

Furthermore, a lane mark detection device according to the present invention comprises: an image acquisition means which acquires an image of a road via an imaging means mounted on a vehicle; an edge extraction means which extracts edge points by performing edge extraction for the image acquired by the image acquisition means; a line search means which searches the edge points extracted by the edge extraction means for line components each of which is point sequence data of a plurality of linearly located edge points; an evaluation value calculation means which calculates an evaluation value indicating the degree that each line component approximates a linear lane mark on the road for the line components searched for by the line search means; a lane mark candidate selection means which selects line components each having an evaluation value or a value obtained by filtering the time series of the evaluation value greater than a predetermined threshold value as candidates for a line component corresponding to the lane mark from the line components searched for by the line search means; and a lane mark detection means which detects the lane mark by determining the line component corresponding to the lane mark from the candidates for the line component selected by the lane mark candidate selection means.

In a situation where, for example, there is a wheel track on a road after rain, according to the vehicle and lane mark detection device of the present invention, line components corresponding to an object other than the lane mark such as a wheel track may be found in some cases besides line components corresponding to the linear lane mark such as a white line as a result of searching the edge points extracted by the edge extraction means for the line components by the line search means. Thus, the evaluation value calculation means calculates the evaluation value indicating the degree that each line component approximates the linear lane mark on the road for the line components searched for by the line search means. Then, the lane mark candidate selection means selects the line components each having the evaluation value or the value obtained by filtering the time series of the evaluation value greater than the predetermined threshold value as candidates for the line component corresponding to the lane mark from the line components searched for by the line search means.

In this case, the line component corresponding to an object other than the lane mark such as a wheel track on the road is not selected since it has a small evaluation value, and therefore it is possible to select a candidate for the line component corresponding to the lane mark with distinction between a linear lane mark such as a white line and an object other than the lane mark such as the wheel track on the road, even though such distinction is difficult to be made merely by the edge extraction and the line search. Moreover, the lane mark detection means detects the lane mark by determining the line component corresponding to the lane mark from the selected line components, and therefore it is possible to prevent the object other than the lane mark such as the wheel track on the road from being incorrectly detected as a lane mark, thereby increasing the detection accuracy of the linear lane mark such as a white line. Particularly the use of the value obtained by filtering the time series of the evaluation value enables a stable detection of the linear lane mark.

Furthermore, in the vehicle and the lane mark detection device according to the present invention, the evaluation value calculation means calculates the evaluation value by using a ratio between the number of edge points constituting the line component and the number of continuous edge points among the edge points.

According thereto, the edge points constituting the line component corresponding to the linear lane mark such as a white line painted on the road are supposed to be extracted without a break in the image. On the other hand, the parts of the object other than the lane mark such as the wheel track on the road are scattered irregularly and the road condition after rain and the light reflecting state vary within the road surface. Consequently, the edge points constituting the corresponding line component are supposed to be often partially discontinuous in the image. Therefore, the evaluation value calculation means is capable of calculating the evaluation value enabling a distinction between the linear lane mark such as a white line and the object other than the lane mark such as the wheel track on the road by using the ratio between the number of edge points constituting the line component and the number of continuous edge points among the edge points.

Moreover, in the vehicle and the lane mark detection device according to the present invention, the evaluation value calculation means calculates the evaluation value by performing correction based on a distance between the position of the line component in the real space and the vehicle for the ratio between the number of edge points constituting the line component and the number of continuous edge points among the edge points.

According thereto, the size of the area corresponding to the object to be detected such as the lane mark in the image captured by the imaging means decreases along with an increase in the distance between the object to be detected and the vehicle. Therefore, the resolution decreases in the image processing per unit length of the object to be detected in the real space. Moreover, the low resolution makes it difficult to determine that the edge points constituting the line component corresponding to the object to be detected are discontinuous in the image, and therefore it is considered that the ratio between the number of edge points constituting the line component corresponding to the object to be detected and the number of continuous edge points among the edge points changes according to the resolution. Therefore, the evaluation value calculation means calculates the evaluation value by performing the correction based on the distance between the position of the line component in the real space and the vehicle for the ratio between the number of edge points constituting the line component and the number of continuous edge points among the edge points, which enables the calculation of an evaluation value which changes according to the distance from the vehicle and which reflects the effect of a change in resolution for the image processing on the object to be detected.

Furthermore, in the vehicle and the lane mark detection device according to the present invention, the evaluation value calculation means performs the correction by multiplying the ratio between the number of edge points constituting the line component and the number of continuous edge points among the edge points by a correction factor set so as to decrease as the distance between the position of the line component in the real space and the vehicle increases.

According thereto, the greater the distance between the object to be detected such as the lane mark and the vehicle is, the smaller the object to be detected is in the image, which decreases the resolution for the image processing per unit length of the object to be detected in the real space. Moreover, the low resolution makes it difficult to determine that the edge points constituting the line component corresponding to the object to be detected are discontinuous in the image, and therefore it is supposed that the ratio between the number of edge points constituting the line component corresponding to the object other than a lane mark and the number of continuous edge points among the edge points easily increases. Therefore, the evaluation value calculation means calculates the evaluation value as the correction by multiplying the ratio between the number of edge points constituting the line component and the number of continuous edge points among the edge points by the correction factor set so as to decrease as the distance between the position of the line component in the real space and the vehicle increases. This inhibits the line component from being selected as a candidate for the line component corresponding to the lane mark due to a high evaluation value of the line component corresponding to the object other than the lane mark far from the vehicle.

Furthermore, in the vehicle and the lane mark detection device according to the present invention, the evaluation value calculation means sets the correction factor to a predetermined upper limit in the case where the distance between the position of the line component in the real space and the vehicle is less than a first predetermined distance.

According thereto, if the correction factor is increased in a situation where the distance between the object to be detected such as a lane mark and the vehicle is less than the first predetermined distance and the resolution for the image processing per unit length of the object to be detected in the real space is sufficiently high, there is a possibility that the line component corresponding to the object other than the lane mark is selected as a candidate for the line component corresponding to the lane mark due to an increase in the evaluation value of the line component corresponding to the object other than the lane mark. Therefore, the evaluation value calculation means calculates the evaluation value with the correction factor set to the predetermined upper limit in the case where the distance between the position of the line component in the real space and the vehicle is less than the first predetermined distance. This prevents the correction factor from excessively increasing when calculating the evaluation value of the line component corresponding to the object to be detected near the vehicle and inhibits the line component corresponding to the object other than the lane mark located near the vehicle from being selected as a candidate for the line component corresponding to the lane mark due to a high evaluation value of the line component corresponding to the object other than the lane mark.

Furthermore, in the vehicle and the lane mark detection device according to the present invention, the evaluation value calculation means sets the correction factor to a predetermined lower limit in the case where the distance between the position of the line component in the real space and the vehicle is greater than a second predetermined distance.

According thereto, in a situation where a distance between the object to be detected such as a lane mark and the vehicle is greater than the second predetermined distance and resolution for the image processing per unit length of the object to be detected in the real space is insufficient, it is supposed to be impossible to calculate a reliable evaluation value. Therefore, the evaluation value calculation means calculates the evaluation value with the correction factor set to the predetermined lower limit in the case where the distance between the position of the line component in the real space and the vehicle is more than the second predetermined distance. This causes the evaluation values of the line components far from the vehicle having insufficient resolution to be uniformly low, thereby inhibiting the line component corresponding to the object other than the lane mark far from the vehicle from being selected as a candidate for the line component corresponding to the lane mark.

Furthermore, in the vehicle and the lane mark detection device according to the present invention, the lane mark candidate selection means includes a means which specifies a range corresponding to an area apart from the vehicle by a predetermined distance or more in the real space within the image and a means which sets the threshold value for selecting a line component included in the range to a greater value than the threshold value for selecting a line component not included in the range.

According thereto, in the case where the object to be detected such as a lane mark is located in an area far from the vehicle in the real space, the object to be detected is small in the image, which makes it difficult to determine that the edge points constituting the line component corresponding to the object to be detected are discontinuous in the image, and therefore it is supposed that the evaluation value of the line component corresponding to the object other than the lane mark easily increases. Therefore, the lane mark candidate selection means specifies the range corresponding to the area apart from the vehicle by the predetermined distance or more in the real space within the image and sets the threshold value for selecting the line component included in the range to the greater value than the threshold value for selecting the line component not included in the range. This enables a strict determination of the selection for an area apart from the vehicle by the predetermined distance or more and a loose determination of the selection for an area within the predetermined distance from the vehicle, thereby inhibiting the line component corresponding to the object other than the lane mark far from the vehicle from being selected as the candidate for the line component corresponding to the lane mark.

BRIEF DESCRIPTION OF THE DRAWINGS

FIG. 3 is an illustrative diagram of a processed image in the lane mark detection processing in FIG. 2;

BEST MODE FOR CARRYING OUT THE INVENTION

First Embodiment

First, a first embodiment of the present invention will be described below with reference to FIG. 1 to FIG. 5.

Figure 1:
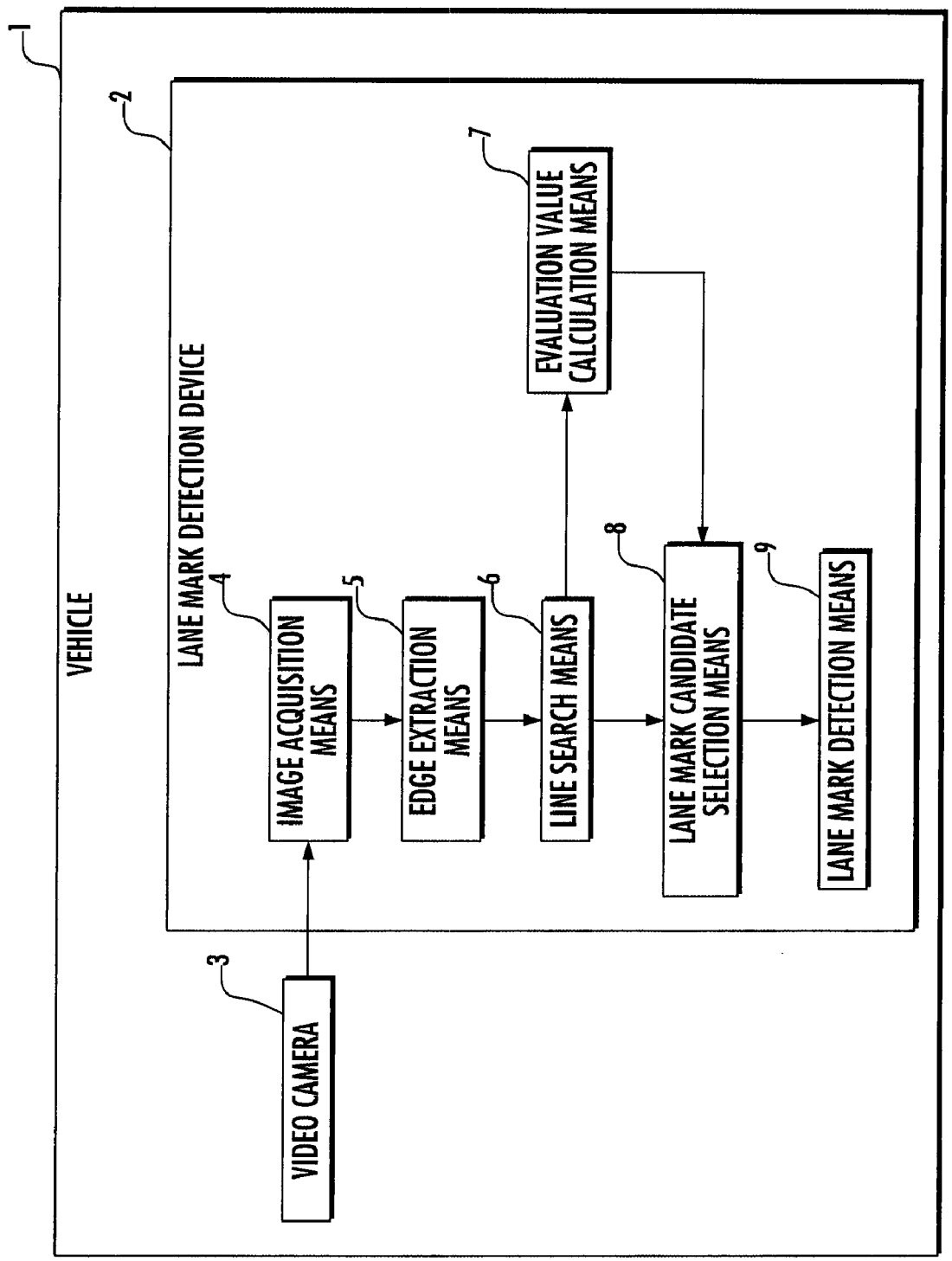
FIG. 1 is a functional block diagram of a lane mark detection device according to a first embodiment of the present invention.

Referring to FIG. 1, a lane mark detection device 2 is an electronic unit containing a microcomputer and the like and is mounted on a vehicle 1, including an image acquisition means 4 which acquires a road image via a video camera 3 mounted on the vehicle 1, an edge extraction means 5 which extracts edge points from the acquired image, a line search means 6 which searches the extracted edge points for a line component, an evaluation value calculation means 7 which calculates an evaluation value indicating the degree that each line component searched for approximates the linear lane mark on the road, a lane mark candidate selection means 8 which selects lane mark candidates from the line components according to the calculated evaluation values, and a lane mark detection means 9 which detects a lane mark from the selected lane mark candidates.

The image acquisition means 4 acquires a road image composed of pixel data via the video camera 3 (the imaging means of the present invention such as a CCD camera) which is attached to the front of the vehicle 1 to capture the image of the road ahead of the vehicle 1. The vehicle of the present invention is constituted by equipping the video camera 3 and the lane mark detection device 2.

The edge extraction means 5 extracts the edge points by performing edge extraction for the image acquired by the image acquisition means 4. The edge point is a point where the image luminance level changes from high luminance (light) to low luminance (dark) or from low luminance (dark) to high luminance (light).

The line search means 6 searches the edge points extracted by the edge extraction means 5 for a line component which is point sequence data of a plurality of linearly located edge points. As a specific approach for searching for a line component by extracting edge points from an image, it is possible to use, for example, a method as described in Japanese Patent No. 3429167 filed by the present applicant.

The evaluation value calculation means 7 calculates an evaluation value indicating the degree that each line component approximates the linear lane mark on the road for the line components searched for by the line search means 6. In this process, the evaluation value calculation means 7 calculates the evaluation value by performing a correction of multiplying a ratio between the number of edge points constituting each line component and the number of continuous edge points among the edge points by a predetermined correction factor.

The lane mark candidate selection means 8 selects line components having an evaluation value, which has been calculated by the evaluation value calculation means 7, greater than a predetermined threshold value from the line components searched for by the line search means 6 as candidates for a line component corresponding to a linear lane mark (candidates for the lane mark). In this process, the lane mark candidate selection means 8 specifies a range corresponding to an area apart from the vehicle 1 by a predetermined distance or more within the image acquired by the image acquisition means 4 and sets a threshold value for selecting a line component included in the range to a value greater than a threshold value for selecting a line component not included in the range.

The lane mark detection means 9 detects a lane mark by determining the line component corresponding to the linear lane mark on the road from the candidates for the line component selected by the lane mark candidate selection means 8.

Subsequently, the operation of the lane mark detection device 2 (lane mark detection processing) according to this embodiment will be described with reference to a flowchart shown in FIG. 2. The following description is given taking an example where the traveling direction of the vehicle 1 is as indicated by an arrow as shown in FIG. 3(a), the right side of the lane of the road along which the vehicle 1 is traveling is defined by a linear lane mark A0, and the left side of the lane is defined by a linear lane mark A1. In the example shown in FIG. 3(a), there is a wheel track (T) near the lane mark A0 in the inside of the lane on the road. In addition, the lane marks A0 and A1 are white lines and are objects of detection by the lane mark detection device 2.

Figure 2:
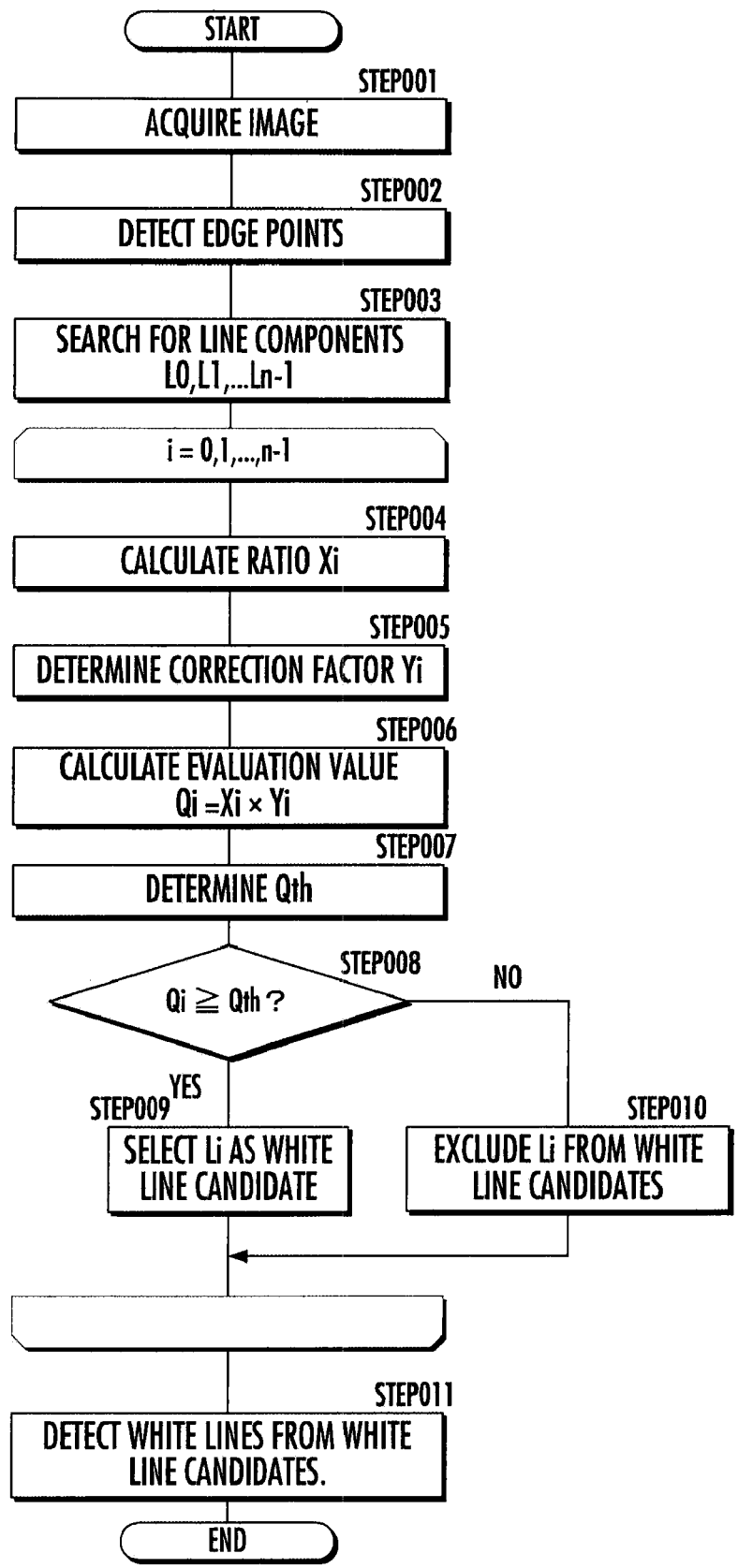
FIG. 2 is a flowchart illustrating lane mark detection processing of the lane mark detection device in FIG. 1.

Referring to FIG. 2, first the image acquisition means 4 acquires an image I0 of a road composed of pixel data by inputting a video signal output from the video camera 3 (step 001). Note that the image I0 includes M rows by N columns of pixels as illustrated in FIG. 3(a). The lane mark detection device 2 of the vehicle 1 performs lane mark detection processing of steps 001 to 011 in FIG. 2 for each predetermined control cycle.

Next in step 002, the edge extraction means 5 extracts edge points by performing edge extraction for the acquired image I0. In this process, the edge extraction means 5 extracts an edge point where the luminance level of the image I0 changes from high luminance (light) to low luminance (dark) as a negative edge point and extracts an edge point where the luminance level changes low luminance (dark) to high luminance (light) as a positive edge point with the search direction oriented to the right on the image I0.

This enables the edge point on the image I0 to be extracted as illustrated in the image I1 of FIG. 3(b). In FIG. 3(b), the positive edge point is indicated by a plus sign "+" and the negative edge point is indicated by a minus sign "−." Referring to FIG. 3(b), the left edge portions of the white lines A0 and A1 are extracted as positive edge points and the right edge portions of the white lines A0 and A1 are extracted as negative edge points. In addition, the left edge portion of the wheel track T is extracted as a positive edge point and the right edge portion of the wheel track T is extracted as a negative edge point.

Next in step 003, the line search means 6 searches the extracted edge points for a line component which is point sequence data of a plurality of linearly located edge points. First, the line search means 6 Hough-transforms the extracted positive edge points and negative edge points to search for a line component L in the Hough space. In this situation, the line component corresponding to the white line generally points to an infinite point on the image and therefore the line search means 6 searches for a point sequence of a plurality of edge points located in straight lines passing through the infinite point. Subsequently, the line search means 6 performs projective transformation from the Hough space to the image space for the data on the line component searched for and further performs projective transformation from the image space to the real space (the coordinate space fixed to the vehicle).

This allows n line components L0, L1, - - -, Ln−1 to be found. The line components L0 to Ln−1 are each made of coordinate data of a point sequence indicated by a plurality of edge points. For example, six line components L0 to L5 are found from edge points shown in an image I1 of FIG. 3(b).

Subsequently, processing of steps 004 to 010 is performed for the line components L0 to Ln−1 which have been found. In the following, the line components L0 to Ln−1 are represented by Li (i=0, 1, - - -, n−1).

First, in step 004, the evaluation value calculation means 7 calculates a ratio Xi between the number Wi of edge points constituting the line component Li and the number Ui of continuous edge points among the edge points to calculate the evaluation value Qi of the line component Li. The evaluation value calculation means 7 calculates the number Ui of continuous edge points among the Wi edge points constituting the line component Li. Then, the evaluation value calculation means 7 calculates the ratio Xi by dividing the number Ui of continuous edge points by the total number Wi of edge points (Xi=Ui/Wi).

Figure 4:
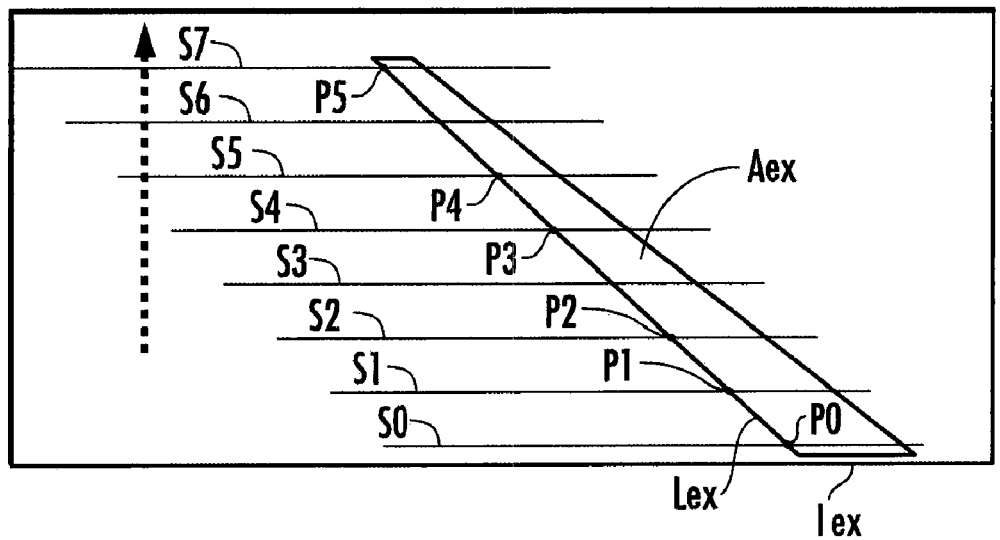
FIG. 4 is an explanatory diagram on calculation of an evaluation value in the lane mark detection processing in FIG. 2.

The process of calculating the ratio Xi will be described below with reference to FIG. 4. The image Iex illustrated in FIG. 4 schematically shows an object to be detected Aex such as a white line and total Wex number of edge points, i.e., six edge points P0 to P5, constituting a line component Lex corresponding to an edge portion of the object to be detected Aex in the inside of the lane. Lines S0 to S7 in the horizontal direction in FIG. 4 are search lines, which correspond to the rows of pixel data of the image Iex, respectively. The traveling direction of the vehicle 1 is indicated by the arrow in FIG. 4.

Referring to FIG. 4, the edge points P0, P1, and P2 are located on the search lines S0, S1, and S2, respectively. No edge point is located on the search line S3, while the edge points P3 and P4 are located on the search lines S4 and S5, respectively. No edge point is located on the search line S6, while the edge point P5 is located on the search line S7. In this situation, the number 3 of edge points {P0, P1, P2}, which includes the largest number of edge points among the combinations of edge points extracted in succession on the adjacent search lines, {P0, P1, P2}, {P3, P4}, and {P5}, is set as the number Uex of continuous edge points. Thereafter, the ratio Xex is calculated by dividing the number Uex of continuous edge points by the total number Wex of edge points.

In the example shown in the image I1 of FIG. 3(b), the edge points constituting the line components L0, L1, L4, and L5 corresponding to the white lines A0 and A1 are extracted without a break in the image I1 and therefore ratios X0, X1, X4, and X5 have relatively great values. On the other hand, the edge points constituting the line components L2 and L3 corresponding to the wheel track T are partially discontinuous in the image I1 and therefore ratios X2 and X3 have relatively small values. This allows a calculation of an evaluation value Qi enabling a distinction between the line components corresponding to the white line A0 and A1 and the line components corresponding to the wheel track T by using the ratio Xi between the number Wi of edge points constituting the line component Li and the number Ui of continuous edge points among the edge points when calculating the evaluation value Qi of the line component Li in step 006 described later.

Figure 5:
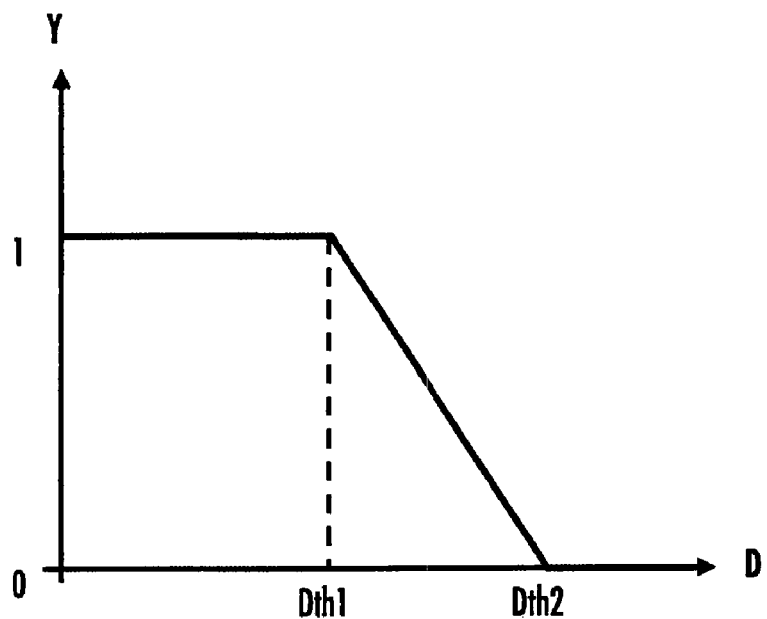
FIG. 5 is a graph illustrating a relationship between a distance between the position of a line component in a real space and a vehicle and a correction factor in the lane mark detection processing in FIG. 2.

Next in step 005, the evaluation value calculation means 7 determines a correction factor Yi for calculating the evaluation value Qi of the line component Li. The correction factor Yi is determined with Y corresponding to D=Di as Yi by using, for example, a graph illustrating a relationship between the distance D between the line component L and the vehicle 1 and the correction factor Y as shown in FIG. 5. The graph in FIG. 5 shows the relationship between the distance D and the correction factor Y with the abscissa axis representing the distance D between the position of the line component L in the real space (the coordinate space fixed to the vehicle) and the vehicle 1 and the ordinate axis representing the correction factor Y.

According to the graph in FIG. 5, the correction factor Y is determined to be 1 when the distance D is less than Dth1. The distance Dth1 is a value (a first predetermined distance of the present invention)-previously determined on the assumption that the resolution for image processing per unit length of the object to be detected such as a white line in the real space is sufficiently high. This prevents the correction factor Y from being excessive when calculating the evaluation value Q of the line component corresponding to the object to be detected, which is located near the vehicle 1, and inhibits a line component corresponding to an object other than a white line near the vehicle 1 from being selected as a candidate for the line component corresponding to the white line due to an increase in the evaluation value Q of the line component corresponding to the object other than the white line near the vehicle 1 in the processing of steps 008 to 010 described later.

In addition, according to the graph in FIG. 5, the correction factor Y is determined to be smaller as the distance D is greater within the range of Dth1 to Dth2 of the distance D. This inhibits the evaluation value Q of the line component corresponding to an object other than a white line far from the vehicle 1 from being set to a great value and consequently inhibits the line component from being selected as a candidate for the line component corresponding to the white line in the processing of steps 008 to 010 described later.

Furthermore, according to the graph of FIG. 5, the correction factor Y is determined to be zero when the distance D is greater than Dth2. The distance Dth2 is a value (a second predetermined distance of the present invention) previously determined on the assumption that the resolution for the image processing per unit length of the object to be detected such as a white line in the real space will be insufficient. This uniformly sets the evaluation value Q to zero for the line components corresponding to the object to be detected far from the vehicle 1 having an insufficient resolution, by which it is possible to inhibit the line components corresponding to the object other than the white line far from the vehicle 1 from being selected as candidates for the line component corresponding to the white line in the processing of steps 008 to 010 described later.

As the distance D between the position of the line component L in the real space and the vehicle 1, specifically, there is used a distance between the edge point whose position in the real space is closest to the vehicle 1 among the edge points constituting the line component L and the vehicle 1. In this instance, the edge point whose position in the real space is closest to the vehicle 1 is the point P0 in the image Iex schematically shown in FIG. 4. Alternatively, it is possible to use a distance between the position in the real space such as a midpoint in the point sequence among the edge points constituting the line component L and the vehicle 1.

Next in step 006, the evaluation value calculation means 7 calculates the evaluation value Qi of the line component Li by multiplying the ratio Xi by the correction factor Yi (Qi=Xi× Yi). This allows a calculation of the evaluation value Qi, which reflects an effect of change in resolution for the image processing on the object to be detected which changes according to the distance from the vehicle 1, and indicates the degree that the line component Li approximates the white line for the line component Li.

Next in step 007, the lane mark candidate selection means 8 determines a threshold value Qth for selecting a candidate for the line component corresponding to the white line. First, the lane mark candidate selection means 8 determines whether the line component Li is included in a range R in the image. The range R is set on the assumption of a range corresponding to an area apart from the vehicle 1 by a predetermined distance or more in the real space. In this embodiment, the range R is set to a range enclosed by a solid line α as shown in an image I2 of FIG. 3(c).

If the line component Li is not included in the range R as a result of the determination, the lane mark candidate selection means 8 sets the threshold value Qth for selecting the candidate for the line component corresponding to the white line to a value Qth1. On the other hand, if the line component Li is included in the range R as a result of the determination, the lane mark candidate selection means 8 sets the threshold value Qth for selecting the candidate for the line component corresponding to the white line to a threshold value Qth2 greater than the threshold value Qth1. This enables a strict determination of the selection for an area apart from the vehicle 1 by a predetermined distance or more and a loose determination of the selection for an area within the predetermined distance from the vehicle, by which it is possible to inhibit the line component corresponding to an object other than the white line far from the vehicle 1 from being selected as a candidate for the line component corresponding to the white line in the processing of steps 008 to 010 described later.

Whether the line component Li is included in the range R is determined, specifically, according to whether the edge point whose position in the real space is closest to the vehicle 1 among the edge points constituting the line component Li is included in the range R.

Next in step 008, the lane mark candidate selection means 8 compares the evaluation value Qi of the line component Li with the threshold value Qth. If a result of the comparison of step 008 is YES (Qi≧Qth), the control proceeds to step 009, where the lane mark candidate selection means 8 selects the line component Li as a candidate for the line component corresponding to the white line (white line candidate). If the result of the comparison of step 008 is NO (Qi<Qth), the control proceeds to step 010, where the lane mark candidate selection means 8 excludes the line component Li from the candidates for the line component corresponding to the white line (white line candidates).

The line component which very closely approximates the white line is selected as a candidate for the line component corresponding to the white line by performing the above processing of steps 004 to 010 for the line components L0 to Ln−1. In the example shown in the image I2 of FIG. 3(c), the line components L2 and L3 found based on the edge points extracted from the edge portions of the wheel track T are not selected as candidates for the line components corresponding to the white line since the evaluation values Q2 and Q3 are relatively low. On the other hand, the line components L0, L1, L4, and L5 found based on the edge points extracted from the edge portions of the white lines A0 and A1 are selected as candidates for the line components corresponding to the white lines since the evaluation values Q0, Q1, Q4, and Q5 are relatively high. Therefore, as shown in an image I3 of FIG. 3(d), the line components L0, L1, L4, and L5 are selected as white line candidates.

Next in step 011, the lane mark detection means 9 detects the white lines A0 and A1, which define the lane along which the vehicle 1 travels, from the selected white line candidates. First, the lane mark detection means 9 determines the line component L1, which is located in the right side area of the image I3, found from the positive edge points, and closest to the center of the lane within the area, as a line component corresponding to the edge portion of the white line A0 in the inside of the lane among the selected white line candidates. Similarly, the lane mark detection means 9 determines the line component L4, which is located in the left side area of the image I3, found from the negative edge points, and closest to the center of the lane within the area, as a line component corresponding to the edge portion of the white line A1 in the inside of the lane.

Subsequently, the lane mark detection means 9 combines the line components L1 and L4 corresponding to the edge portions of the white lines A0 and A1 in the inside of the lane with the line components L corresponding to the edge portions of the white lines A0 and A1 in the outside of the lane, respectively. In the right side area of the image I3, the lane mark detection means 9 combines the line component L0, which is found from the negative edge points located in the right side of the line component L1 and whose distance from the line component L1 seems to be appropriate as a white line, with the line component L1. In the left side area of the image I3, the lane mark detection means 9 combines the line component L5, which is found from the positive edge points located in the left side of the line component L4 and whose distance from the line component L4 seems to be appropriate as a white line, with the line component L4. Thereby, as illustrated in the image I3 of FIG. 3(d), the lane mark detection means 9 detects the white line A0 as an area between the line components L0 and L1 and the white line A1 as an area between the line components L4 and L5.

With the above processing, it is possible to detect the white lines A0 and A1 with high accuracy from the image I0 of the road without incorrectly detecting the wheel track T on the road as a white line.

Second Embodiment

Figure 6:
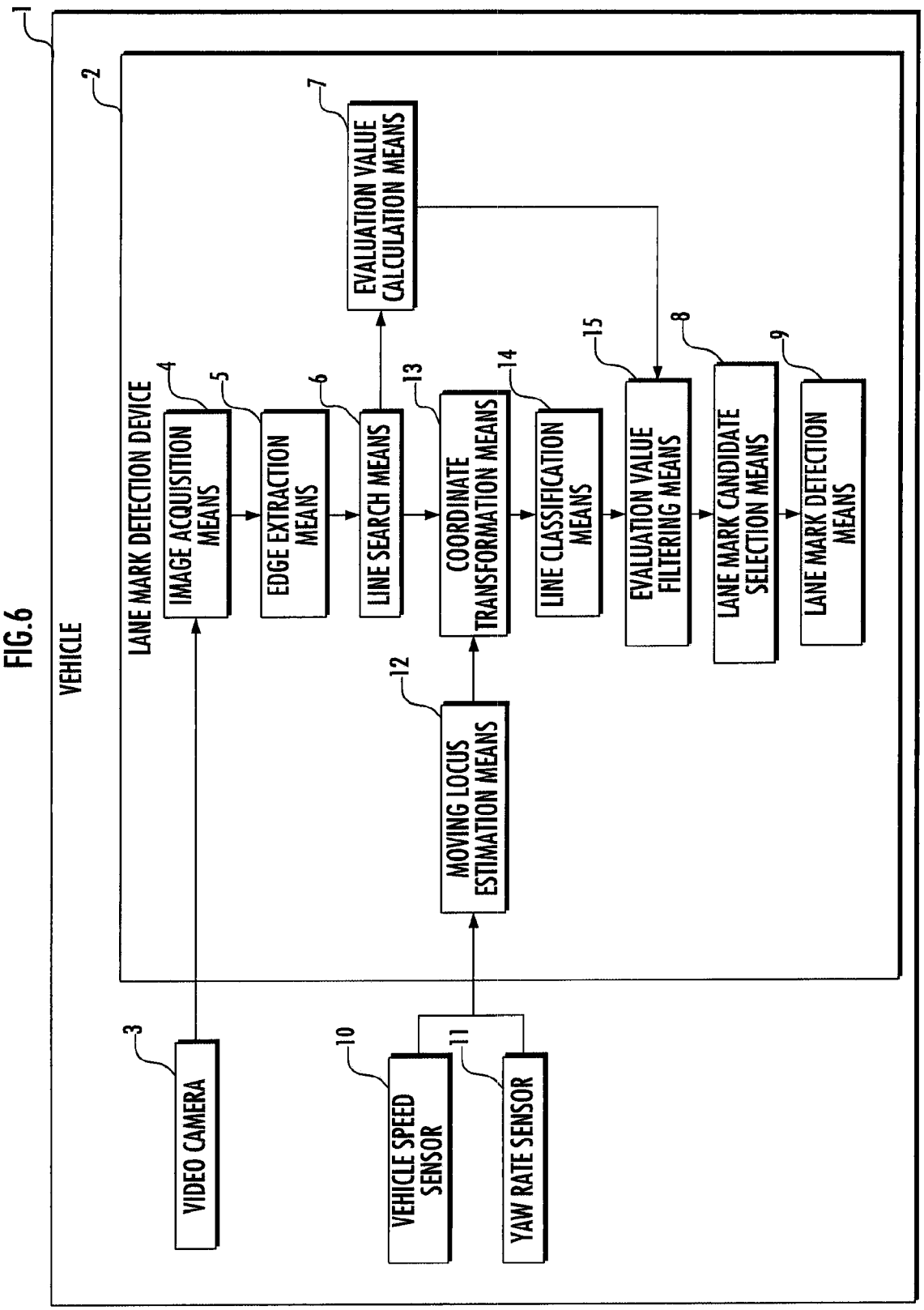
FIG. 6 is a functional block diagram of a lane mark detection device according to a second embodiment of the present invention.

Subsequently, a second embodiment of the present invention will now be described with reference to FIG. 6 and FIG. 7. This embodiment is equivalent to the first embodiment except that the vehicle 1 is equipped with a vehicle speed sensor 10 and a yaw rate sensor 11 and that the lane mark detection device 2 includes a moving trajectory estimation means 12, a coordinate transformation means 13, a line classification means 14, and an evaluation value filtering means 15. In the following description, like elements to those of the first embodiment are denoted by like reference numerals and the description thereof is omitted.

In this embodiment, the vehicle 1 is equipped with the vehicle speed sensor 10 which detects a traveling speed (vehicle speed) of the vehicle 1 and the yaw rate sensor 11 which detects a yaw rate of the vehicle 1.

In addition, the moving trajectory estimation means 12 estimates the moving trajectory of the vehicle 1 on the basis of the vehicle speed of the vehicle 1 detected by the vehicle speed sensor 10 and the yaw rate of the vehicle 1 detected by the yaw rate sensor 11. Then, the coordinate transformation means 13 coordinate-transforms the line component found by the line search means 6 to the real space (absolute space) by using the moving trajectory of the vehicle 1 estimated by the moving trajectory estimation means 12. As a specific approach for coordinate-transforming the line component to the absolute space by estimating the moving trajectory, there is, for example, an approach described in Japanese Patent No. 3538476 filed by the present applicant.

The line classification means 14 determines the identity between the line components found by the line search means 6 in each control cycle and the line components found by the line search means 6 in a control cycle before the control cycle. In this process, the line classification means 14 determines the identity on the basis of coordinate data in the absolute space of each line component, which has been coordinate-transformed by the coordinate transformation means 13. This allows the determination of whether the line components belong to the same group (line components correspond to the same lane mark) between the control cycles, by which the line components are classified into groups.

The evaluation value filtering means 15 filters the evaluation values, calculated by the evaluation value calculation means 7, of the line components for each group classified by the line classification means 14 in the time direction (filters the time series of the evaluation values). Specifically, the evaluation value filtering means 15 selects the moving average of the evaluation values over the past predetermined time period, which is calculated from the line components over the past predetermined time period of the same group as the line component, regarding the line component in each control cycle, as an evaluation value of the line component in the control cycle.

Moreover, in this embodiment, the lane mark candidate selection means 8 selects the line component whose evaluation value filtered by the evaluation value filtering means 15 is greater than a predetermined threshold value as a candidate for a line component corresponding to the linear lane mark on the road (a candidate for the lane mark) from the line components found by the line search means 6. Other parts which are not described in the above are the same as in the first embodiment.

The operation (lane mark detection processing) of the lane mark detection device 2 according to this embodiment will now be described below. The lane mark detection processing in this embodiment differs from the first embodiment only in the process of calculating the evaluation value (step 006 in FIG. 2). Since the flowchart of the lane mark detection processing in this embodiment is the same as in FIG. 2, the following description will be given with reference to the flowchart shown in FIG. 2.

Referring to FIG. 2, in step 006 of this embodiment, the moving trajectory estimation means 12 estimates the traveling trajectory of the vehicle 1, first. Specifically, the moving trajectory estimation means 12 reads the vehicle speed of the vehicle 1 detected by the vehicle speed sensor 10 and the yaw rate of the vehicle 1 detected by the yaw rate sensor 11. Then, the moving trajectory estimation means 12 estimates the moving trajectory in the absolute space of the vehicle 1 by integrating the vehicle speed and the yaw rate of the vehicle 1 over time.

Subsequently, the coordinate transformation means 13 coordinate-transforms the line component Li found by the line search means 6 to the real space (absolute space) by using the moving trajectory of the vehicle 1 estimated by the moving trajectory estimation means 12. As described in the above in the first embodiment, the line component Li found by the line search means 6 is subjected to the projective transformation from the image space to the real space (the coordinate space fixed to the vehicle) in step 003. The projective transformation is performed based on so-called camera parameters such as a focal length or mounting position of a camera. The coordinate space fixed to the vehicle means a two-dimensional coordinate system placed in the road plane with the subject vehicle 1 as an origin. Therefore, the coordinate transformation means 13 coordinate-transforms the line component Li to the absolute space by correcting the line component Li found by the line search means 6 using the moving trajectory in the absolute space of the subject vehicle 1.

Subsequently, the line classification means 14 determines the identity between the line component Li(t+1) found by the line search means 6 in the control cycle of time t+1 (t=0, 1, 2, - - -) and the line components L0(*t*) to Ln−1(t) found by the line search means 6 in the control cycle of time t just before the time t+1 and classifies the line component Li(t+1) in each group Gi. Note that each group Gi indicates the line components corresponding to the same lane mark. In this process, the line classification means 14 determines the identity on the basis of the coordinate data which has been coordinate-transformed by the coordinate transformation means 13 of the line component Li(t+1) and the line components L0(*t*) to Ln−1(t).

Figure 7:
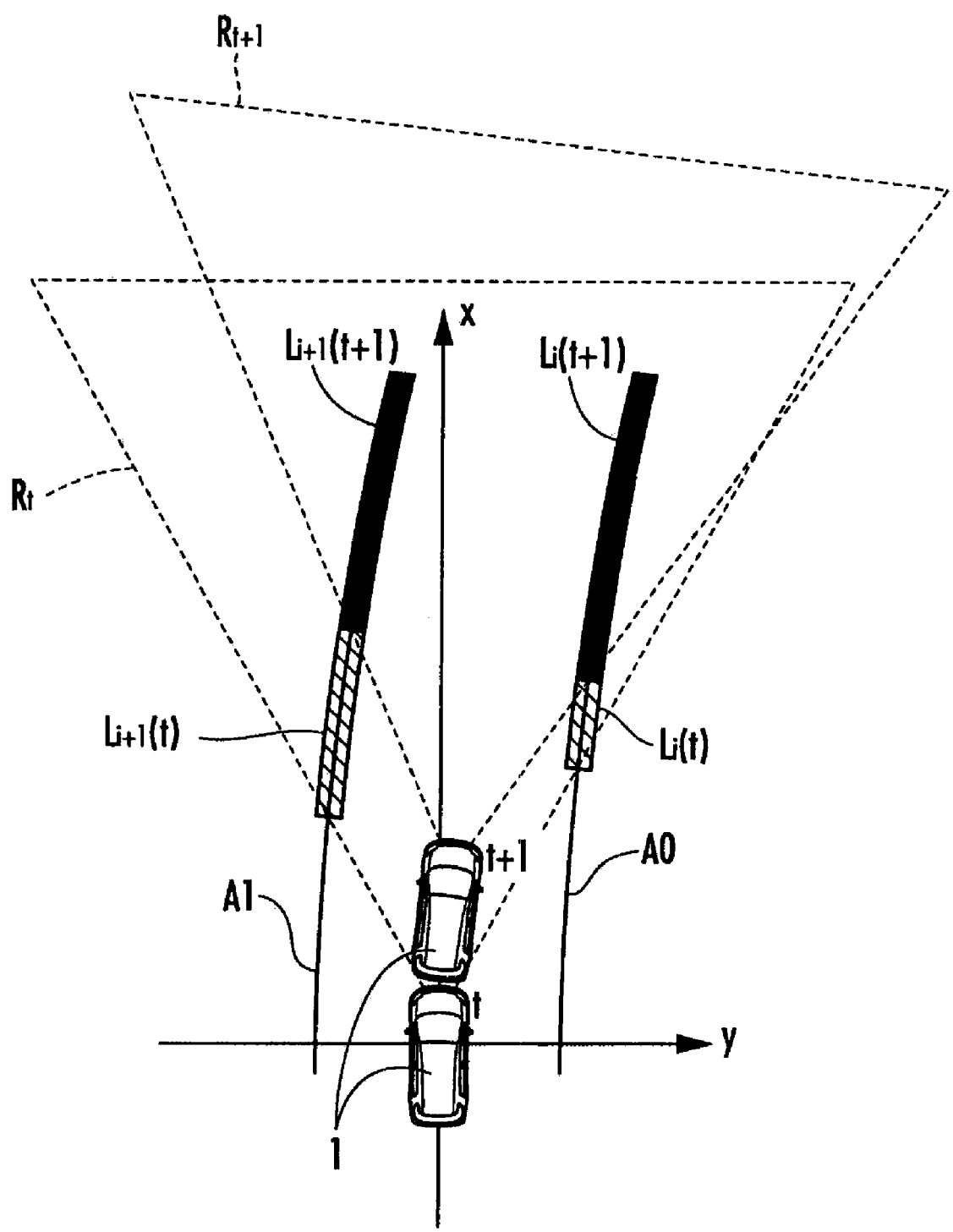
FIG. 7 is an explanatory diagram on a process of classifying line components in the lane mark detection processing of the lane mark detection device in FIG. 6.

The following describes the process of classifying the line components with reference to FIG. 7. FIG. 7 illustrates the outline of the road along which the vehicle 1 travels, viewed from the above of the vehicle 1. FIG. 7 shows the position of the vehicle 1 at time t and the position of the vehicle 1 at time t+1 in the absolute space. In FIG. 7, the coordinate system is a plane rectangular coordinate system with the x axis and the y axis as coordinate axes, being set up with its origin at the center of the vehicle 1 at time t and with the x axis in the traveling direction of the vehicle 1 at time t. Moreover, the vehicle 1 is traveling along the lane defined by the lane marks A0 and A1.

Referring to FIG. 7, the range captured by the video camera 3 mounted on the vehicle 1 at time t is the imaging range Rt and the line components Li(t) and Li+1(t) found from the image acquired at time t are located in the positions indicated by the shaded areas in FIG. 7. In addition, the range captured by the video camera 3 mounted on the vehicle 1 at time t+1 is the imaging range Rt+1. The line components Li(t+1) and Li+1(t+1) found from the image acquired at time t+1 are located in the positions indicated by the solid areas in FIG. 7.

The line component Li(t) is classified in the group Gi, and the line component Li+1(t) is classified in a group Gi+1 at time t. Both of the line components Li(t+1) and Li(t) correspond to the lane mark A0 and both of the line components Li+1(t+1) and Li+1(t) correspond to the lane mark A1.

In this situation, the line components Li(t+1) and Li(t) corresponding to the same lane mark overlap in the absolute space as shown in FIG. 7. Moreover, the line components Li+1(t+1) and Li+1(t) corresponding to the same lane mark overlap in the absolute space. Therefore, it is possible to determine whether the line components belong to the same group (the line components correspond to the same lane mark) according to whether the degree of overlap in the absolute space is equal to or greater than a predetermined value. For example, the line component Li(t+1) is classified in the group Gi and the line component Li+1(t+1) is classified in the group Gi+1.

Subsequently, the evaluation value filtering means 15 filters the time series of the evaluation value Qi calculated by the evaluation value calculation means 7 of the line component Li for each group classified by the line classification means 14. For example, it is assumed that the line component Li(t+1) at the predetermined time point t+1 is classified in the group Gi and that the group Gi includes time series data {Li(0), - - - , Li(t), Li(t+1)} of the line component. For the line component of the group Gi, the time series data of the evaluation value calculated by the evaluation value calculation means 7 is {Qi(0), - - - , Qi(t), Qi(t+1)}. In this condition, the evaluation value filtering means 15 selects the moving average of the evaluation value over the past predetermined time period of {Qi(0), - - - , Qi(t), Qi(t+1)} as the evaluation value Qi of the line component Li in the control cycle of the predetermined time point t+1.

In this manner, filtering the time series of the evaluation value Qi reduces noise components caused by some fading of the white line or reduces an effect of a cyclic decrease in the evaluation value caused by a dashed white line or other originally broken lines, by which the evaluation value is stably calculated. Therefore, the candidate for the line component corresponding to the white line (white line candidate) is selected more stably in the processing of steps 008 to 010. The operations other than those described in the above are the same as in the first embodiment.

With the above processing, it is possible to detect the white lines A0 and A1 from the road image I0 with high accuracy without incorrectly detecting the wheel track T on the road as a white line similarly to the first embodiment.

In the lane mark detection processing in the first and second embodiments, noise reduction is generally performed by removing edge points, as noise, which are located in the area apart a predetermined distance or more from the position of the line component detected as a white line in a control cycle just before each control cycle, from the plurality of edge points extracted from the image acquired in each control cycle. The noise reduction is performed to prevent an object other than a white line defining a lane from being incorrectly detected as a white line by removing the edge points extracted from the object other than the white line defining the lane in the image. The noise reduction, however, may remove edge points extracted from the white line in the image as noise in the case where the lane width suddenly changes, by which the white line may not be detected in some cases. Therefore, the lane mark detection device 2 according to the present invention selects white line candidates by using evaluation values indicating the degree of approximation to the white line from the line components found from the plurality of edge points including the edge points conventionally removed as noise without performing the noise reduction, by which it is possible to detect the white line from the road image with high accuracy even if the lane width suddenly changes.

While the lane mark candidate selection means 8 sets the range R and changes the threshold value Qth according to whether the line component Li is included in the range R in the first and second embodiments, alternatively the lane mark candidate selection means 8 may use the same threshold value Qth for all line components without setting the range R.

Furthermore, in the first and second embodiments, the evaluation value calculation means 7 may calculate the correction factor Y by a correlation equation between a preset distance D and the correction factor Y, instead of determining the correction factor Y from the graph illustrated in FIG. 5 or may determine the correction factor Y using a data table showing correspondence between the preset distance D and the correction factor Y.

Moreover, while the white line is detected as a linear lane mark in the first and second embodiments, the effect of the present invention is achievable also in the case where a linear lane mark having other colors such as, for example, a yellow line is to be detected. In this case, it is assumed that the edge extraction means 5 extracts edge points by performing edge extraction that supports the corresponding color other than the white line for the image.

INDUSTRIAL APPLICABILITY

As described hereinabove, the present invention is capable of detecting the linear lane mark such as a white line with high accuracy by processing the image of the road ahead of the vehicle, and therefore it is adapted for use in presenting information for a driver in the vehicle or controlling vehicle behaviors.

The invention claimed is:

1. A vehicle comprising:
   an imaging means;
   an image acquisition means which acquires an image of a road via the imaging means;
   an edge extraction means which extracts edge points by performing edge extraction for the image acquired by the image acquisition means;
   a line search means which searches the edge points extracted by the edge extraction means for line components each of which is point sequence data of a plurality of linearly located edge points;
   an evaluation value calculation means which calculates an evaluation value indicating a degree that each line component approximates a linear lane mark on the road for the line components searched for by the line search means, wherein
      the evaluation value calculation means calculates the evaluation value by using a ratio between a number of the edge points constituting the line component and a number of continuous edge points among the edge points;
   a lane mark candidate selection means which selects line components each having an evaluation value or a value obtained by filtering a time series of the evaluation value greater than a predetermined threshold value as candidates for a line component corresponding to a lane mark from the line components searched for by the line search means; and
   a lane mark detection means which detects the lane mark by determining the line component corresponding to the lane mark from the candidates for the line component selected by the lane mark candidate selection means.

2. The vehicle according to claim 1, wherein the evaluation value calculation means calculates the evaluation value by performing a correction based on a distance between the position of the line component in the real space and the vehicle for the ratio between the number of edge points constituting the line component and the number of continuous edge points among the edge points.

3. The vehicle according to claim 1, wherein the lane mark candidate selection means includes a means which specifies a range corresponding to an area apart from the vehicle by a predetermined distance or more in the real space within the image and a means which sets the predetermined threshold value for selecting a line component included in the range to a greater value than the threshold value for selecting a line component not included in the range.

4. The vehicle according to claim 2, wherein the evaluation value calculation means performs the correction by multiplying the ratio between the number of edge points constituting the line component and the number of continuous edge points among the edge points by a correction factor set so as to decrease as the distance between the position of the line component in the real space and the vehicle increases.

5. The vehicle according to claim 4, wherein the evaluation value calculation means sets the correction factor to a predetermined upper limit in a case where the distance between the position of the line component in the real space and the vehicle is less than a first predetermined distance.

6. The vehicle according to claim 4, wherein the evaluation value calculation means sets the correction factor to a predetermined lower limit in a case where the distance between the position of the line component in the real space and the vehicle is greater than a second predetermined distance.

7. The vehicle according to claim 5, wherein the evaluation value calculation means sets the correction factor to a predetermined lower limit in a case where the distance between the position of the line component in the real space and the vehicle is greater than a second predetermined distance.

8. A lane mark detection device comprising:
   an image acquisition means which acquires an image of a road via an imaging means mounted on a vehicle;
   an edge extraction means which extracts edge points by performing edge extraction for the image acquired by the image acquisition means;
   a line search means which searches the edge points extracted by the edge extraction means for line components each of which is point sequence data of a plurality of linearly located edge points;
   an evaluation value calculation means which calculates an evaluation value indicating a degree that each line component approximates a linear lane mark on the road for the line components searched for by the line search means, wherein
      the evaluation value calculation means calculates the evaluation value by using a ratio between a number of the edge points constituting the line component and a number of continuous edge points among the edge points;
   a lane mark candidate selection means which selects line components each having an evaluation value or a value obtained by filtering a time series of the evaluation value greater than a predetermined threshold value as candidates for a line component corresponding to a lane mark from the line components searched for by the line search means; and
   a lane mark detection means which detects the lane mark by determining the line component corresponding to the lane mark from the candidates for the line component selected by the lane mark candidate selection means.

9. The lane mark detection device according to claim 8, wherein the evaluation value calculation means calculates the evaluation value by performing a correction based on a distance between the position of the line component in the real space and the vehicle for the ratio between the number of edge points constituting the line component and the number of continuous edge points among the edge points.

10. The lane mark detection device according to claim 8, wherein the lane mark candidate selection means includes a means which specifies a range corresponding to an area apart from the vehicle by a predetermined distance or more in the real space within the image and a means which sets the predetermined threshold value for selecting a line component included in the range to a greater value than the threshold value for selecting a line component not included in the range.

11. The lane mark detection device according to claim 9, wherein the evaluation value calculation means performs the correction by multiplying the ratio between the number of edge points constituting the line component and the number of continuous edge points among the edge points by a correction factor set so as to decrease as the distance between the position of the line component in the real space and the vehicle increases.

12. The lane mark detection device according to claim 11, wherein the evaluation value calculation means sets the correction factor to a predetermined upper limit in a case where the distance between the position of the line component in the real space and the vehicle is less than a first predetermined distance.

13. The lane mark detection device according to claim 11, wherein the evaluation value calculation means sets the correction factor to a predetermined lower limit in a case where the distance between the position of the line component in the real space and the vehicle is greater than a second predetermined distance.

14. The lane mark detection device according to claim 12, wherein the evaluation value calculation means sets the correction factor to a predetermined lower limit in a case where the distance between the position of the line component in the real space and the vehicle is greater than a second predetermined distance.

* * * * *